(12) United States Patent
Juriga et al.

(10) Patent No.: US 6,802,637 B2
(45) Date of Patent: Oct. 12, 2004

(54) HAND-HELD MIXER HAVING A SWITCHING MEANS CONFIGURATION FOR SWITCHING TO SEVERAL LOWER SPEEDS AND FOR SWITCHING TO A HIGHER SPEED OF MIXING TOOLS

(75) Inventors: Jan Juriga, Klagenfurt (AT); Hans Peter Krall, Eberstein (AT); Martin Sonnek, St. Veit/Glan (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/893,126

(22) Filed: Jun. 27, 2001

(65) Prior Publication Data

US 2002/0051405 A1 May 2, 2002

(30) Foreign Application Priority Data

Jun. 27, 2000  (EP) ............................................. 00890198

(51) Int. Cl.[7] ............................................. A47J 43/044
(52) U.S. Cl. ........................ 366/129; 366/601; 388/936; 388/937; 200/550
(58) Field of Search ................................. 366/129, 206, 366/101, 300, 301, 344; 388/936, 937; 200/547–591, 332.2

(56) References Cited

U.S. PATENT DOCUMENTS

| | | | | |
|---|---|---|---|---|
| 2,182,083 A | * | 12/1939 | Jepson et al. | |
| 2,469,043 A | * | 5/1949 | Kennedy | |
| 2,671,191 A | * | 3/1954 | Braski | |
| 2,703,381 A | * | 3/1955 | Jepson | |
| 2,930,597 A | * | 3/1960 | Howell et al. | |
| 3,097,318 A | * | 7/1963 | Jepson | |
| 3,533,600 A | * | 10/1970 | Gerson | |
| 3,924,169 A | * | 12/1975 | Craft et al. | |
| 4,277,181 A | * | 7/1981 | Stahly et al. | |
| 4,324,958 A | * | 4/1982 | Valleau | |
| 4,349,758 A | * | 9/1982 | Grant, Jr. et al. | |
| 5,310,259 A | | 5/1994 | Wanat | 366/349 |
| 6,079,865 A | * | 6/2000 | Plavcan et al. | |
| 6,093,987 A | * | 7/2000 | Bukoschek et al. | |
| 2002/0018398 A1 | * | 2/2002 | Krall et al. | |

FOREIGN PATENT DOCUMENTS

| | | |
|---|---|---|
| DE | 3447741 A1 | 6/1986 |
| WO | WO 01/19225 A2 * | 3/2001 |

* cited by examiner

Primary Examiner—David Sorkin
(74) Attorney, Agent, or Firm—Ernestine C. Bartlett

(57) ABSTRACT

In a hand mixer (1) having two mains terminals (10, 11) and having interference suppression means (16) for a motor (27) and having a switching means configuration (130) which includes speed switching means (60) for switching the speed of the motor (27) to different lower speed values and start means (61) for starting the motor (27) at a higher speed, the two mains terminals (10, 11) and the speed switching means (60) and the start means (61) and preferably also the interference suppression means are connected mechanically and electrically to form a module (9), all the electrical connections between said parts of the module (9) being realized on the module (9).

20 Claims, 6 Drawing Sheets

HAND-HELD MIXER HAVING A SWITCHING MEANS CONFIGURATION FOR SWITCHING TO SEVERAL LOWER SPEEDS AND FOR SWITCHING TO A HIGHER SPEED OF MIXING TOOLS

BACKGROUND OF THE INVENTION

The invention relates to a hand mixer having two mains terminals, which serve for the connection to an a.c. mains, having interference suppression means connected to the two mains terminals for the purpose of interference suppression, and having a motor, which serves for driving mixing tools and which can be brought into electrically conductive contact with the two mains terminals and which is adapted to be energized from an a.c. mains and which is adapted to effect driving with at least two lower speeds and with a speed which is higher than the lower speeds, and having a switching means configuration which includes speed switching means for switching the speed of the motor to different lower speed values, which speed switching means can be actuated with the aid of a first switching handle, and which includes start means for starting the motor at the higher speed, which start means can be actuated with the aid of a second switching handle.

The invention further relates to a switching means configuration for a hand-held mixer, which hand-held mixer has two mains terminals, which serve for the connection to an a.c. mains, and which has interference suppression means connected to the two mains terminals for the purpose of interference suppression, and which has a motor, which serves for driving mixing tools and which can be brought into electrically conductive contact with the two mains terminals and which is adapted to be energized from an a.c. mains and which is adapted to effect driving with at least two lower speeds and with a speed which is higher than the lower speeds, which switching means configuration includes speed switching means for switching the speed of the motor to different lower speed values, which speed switching means can be actuated with the aid of a first switching handle, and which switching means configuration includes start means for starting the motor at the higher speed, which start means can be actuated with the aid of a second switching handle.

Such a hand-held mixer of the type defined in the first paragraph, having a such a switching means configuration of the type defined in the second paragraph, has been put on the market in different versions by the applicant and is therefore known. In the known hand-held mixer and in the known switching means configuration two separate mains terminals are followed by separate interference suppression means for interference suppression purposes and a separate speed selection switch for selectively switching to three lower motor speeds and a separate switch, namely a so-called microswitch, for starting at a high motor speed. The interference suppression means, the speed selection means as well as the microswitch are each arranged at a separate location inside the hand-held mixer, as a result of which the interference suppression means and the speed selection switch as well as the microswitch must each be mounted in the housing of the hand-held mixer in a separate mounting operation and, furthermore, the electrical connections between the two mains terminals and the interference suppression means and the speed selection switch and the microswitch and the motor must be realized with the aid of connecting wires. Thus, the known hand-held mixer and the known switching means configuration are of a quite intricate construction, which in addition also requires a comparatively expensive and complicated mounting process.

BRIEF SUMMARY OF THE INVENTION

It is an object of the invention to preclude the aforementioned problems and to provide an improved hand-held mixer and an improved switching means configuration.

According to the invention, in order to achieve this object with a hand-held mixer of the type defined in the first paragraph, the two mains terminals and the speed switching means and the start means are connected mechanically and electrically to form a module, and all the electrical connections between the two mains terminals and the speed switching means and the start means are realized on the module.

It will be apparent to those of ordinary skill in the art from the description below, that as used herein the word module means an assembly of components that are assembled, and are then mounted together in an apparatus such as a hand mixer, and constitute a functional unit of the hand mixer. The module does not include such other parts of the apparatus such as a frame or housing to which the module is mounted, and does not include other parts of the apparatus which are mounted separately from the module and are connected mechanically and/or electrically to the module or one or more of its components.

Furthermore, according to the invention, in order to achieve said object with a switching means configuration of the type defined in the second paragraph, the switching means configuration is realized by means of a module in which the speed switching means and the start means as well as the two mains terminals for a hand-held mixer are connected mechanically and electrically to this module, and all the electrical connections between the two mains terminals and the speed switching means and the start means are realized on the module.

The provision of the characteristic features in accordance with the invention results in a simple construction which can be very compact. A switching means configuration in accordance with the invention requires only comparatively little space and can be manipulated simply in order to mount it in the housing of a hand-held mixer in accordance with the invention and can be fitted easily and simply into the housing of a hand-held mixer. Since the two mains terminals and the speed switching means as well as the start means are wholly accommodated on the module the electrically conductive connections between said parts of the switching means configuration are also very simple.

For a hand-held mixer in accordance with the invention and a switching means configuration in accordance with the invention it has proved to be very advantageous when the interference-suppression means are also incorporated in the module because this results in a particularly simple construction, in which practically all the electrically relevant parts of the hand-held mixer, except for the motor, are combined to form an easy-to-mount module. However, it is to be noted that in the case of special requirements an interference suppression capacitor provided as interference suppression means may alternatively be arranged directly on the motor for a hand-held mixer in accordance with the invention, which capacitor can discharge via the motor windings, as a result of which no separate discharge resistor is needed in that case.

For a hand-held mixer in accordance with the invention and a switching means configuration in accordance with the invention it has further proved to be very advantageous when connecting leads are fixedly connected to the module and have free ends arranged to be connected to the motor terminals. Such an embodiment is advantageous in view of a simple construction and in view of a simple to realize electrical connection between the module and a motor.

Furthermore, it has proved to be very advantageous when the module further comprises:

a supporting member bounded by a bounding surface, electrically conductive contact strips connected to the supporting member in the area of the bounding surface and extending parallel to a strip direction, a first slider which is guided so as to be movable relative to the supporting member parallel to the strip direction and which serves as a mating-contact holder and carries at least two mating contacts which are interconnected in an electrically conductive manner, which cooperate with the contact strips and which together with the contact strips) form the speed switching means, a second slider which is guided so as to be movable relative to the supporting member and which serves as switching actuator, and a switching contact which is disposed in the path of movement of the second slider and which forms part of the start means.

Tests have proved that these embodiments are particularly advantageous, especially in view of a simple construction and a very low susceptibility to faults.

For a hand-held mixer in accordance with the invention and a switching means configuration in accordance with the invention it has proved to be very advantageous when the second slider is also guided so as to be movable parallel to the strip direction. This guarantees a particularly compact construction.

Furthermore, it has proved to be advantageous for a hand-held mixer in accordance with the invention and a switching means configuration in accordance with the invention when at least two mating contacts which are carried by the first slider and which are interconnected in an electrically conductive manner are associated with a contact link. This is advantageous for a particularly simple as well as very reliable construction. The afore-mentioned aspects as well as further aspects of the invention will be apparent from the example of an embodiment described hereinafter and will be elucidated with reference to this example.

The invention will be described in more detail hereinafter with reference to an example of an embodiment which is shown in the drawings but to which the invention is not limited.

DETAILED DESCRIPTION OF THE INVENTION

Figure 1:
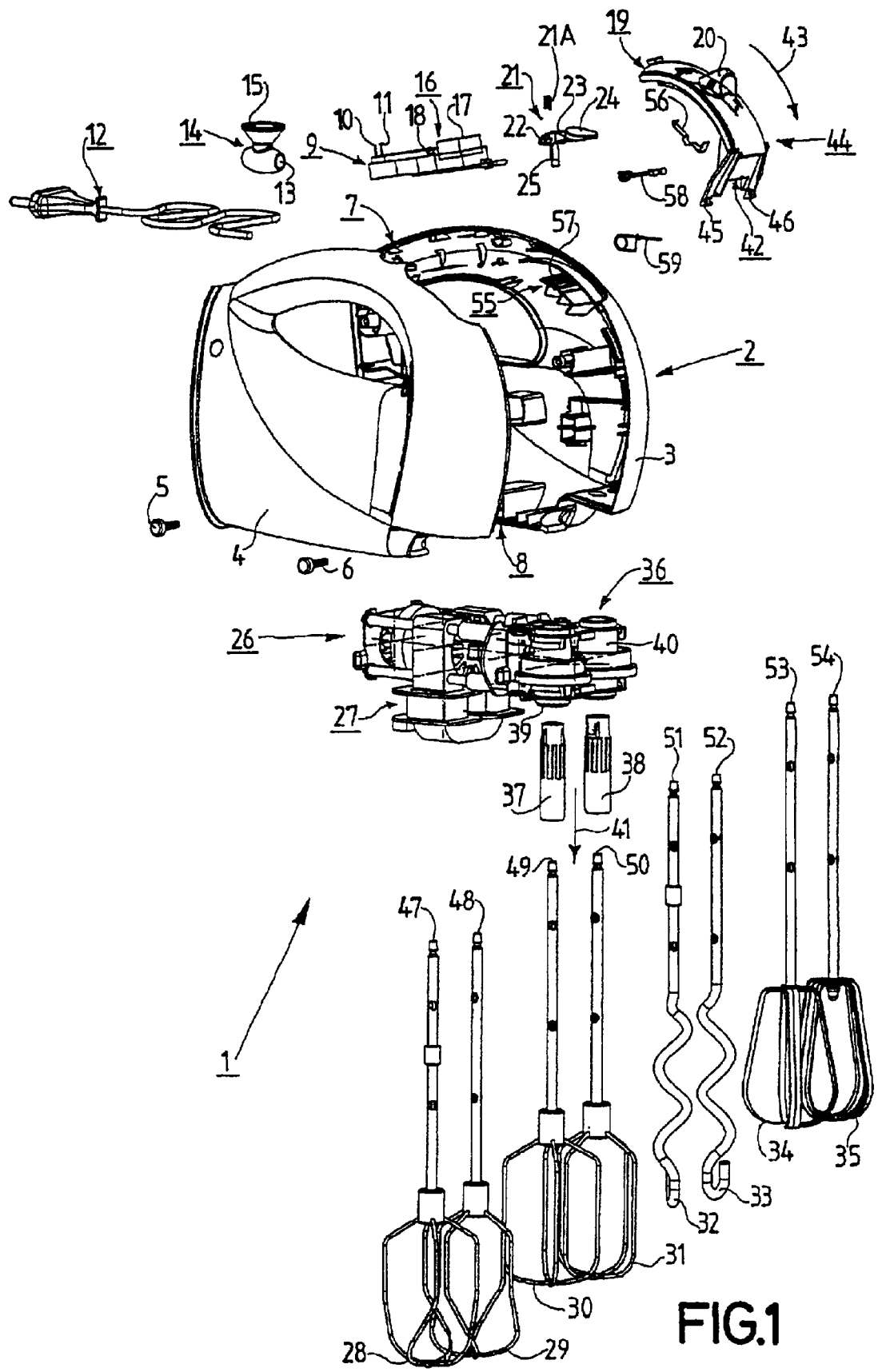
FIG. 1 is an exploded view of a hand-held mixer in accordance with a first embodiment of the invention.
Figure 2:
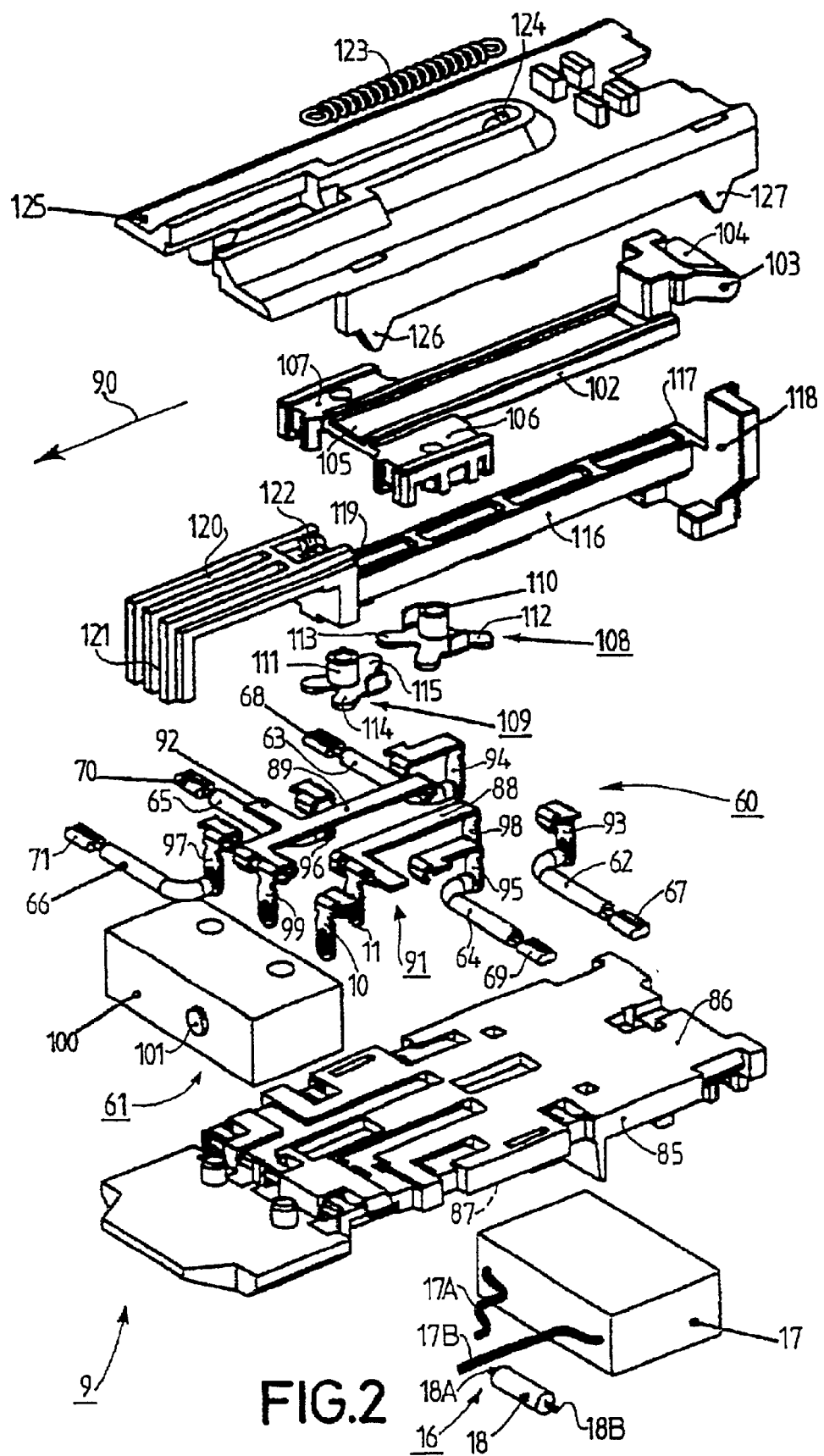
FIG. 2 shows a first module of the hand-held mixer of FIG. 1 in an exploded view and in an oblique underneath view.
Figure 3:
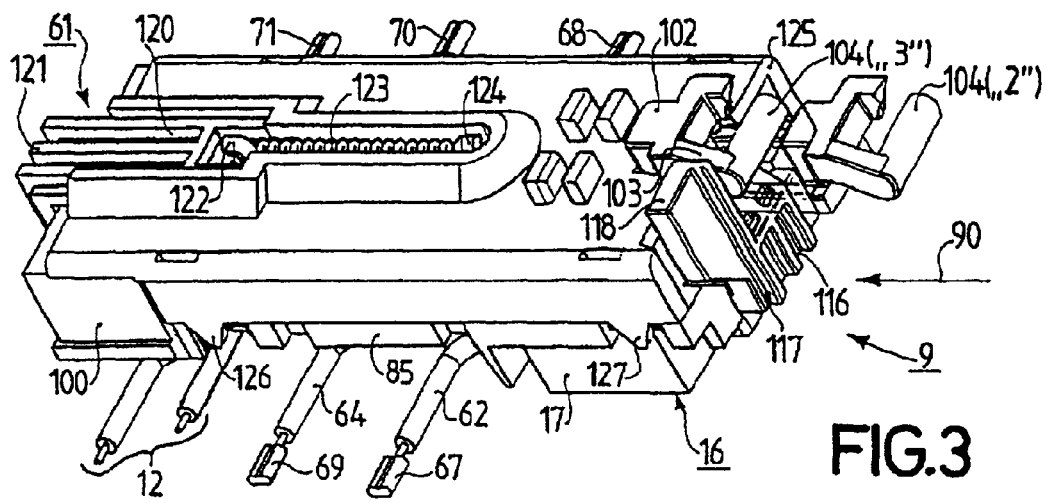
FIG. 3 is an oblique underneath view of the first module of FIG. 2 in its assembled condition.
Figure 4:
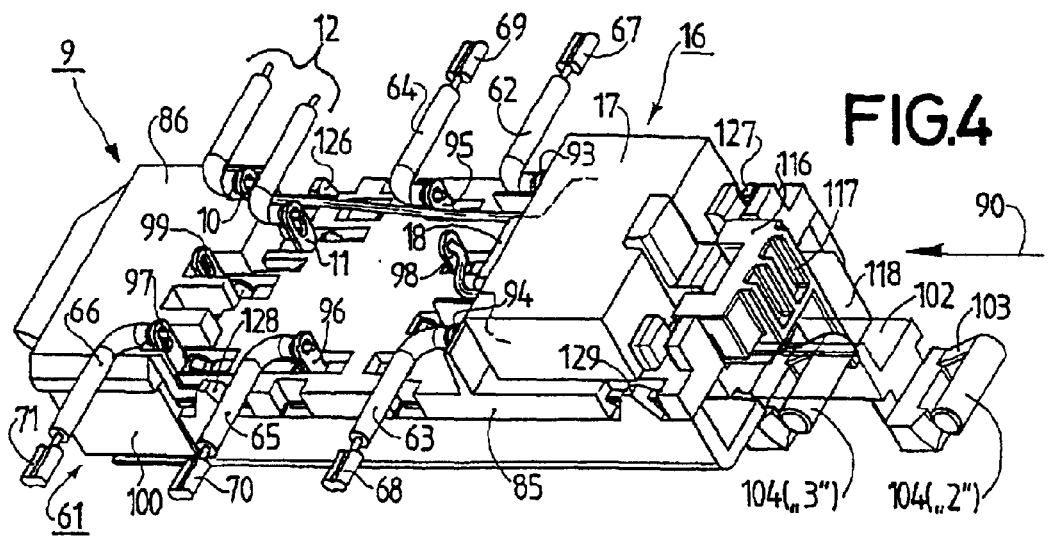
FIG. 4 is an oblique view from the top and the front, showing the first module of FIGS. 2 and 3 in its assembled condition.
Figure 5:
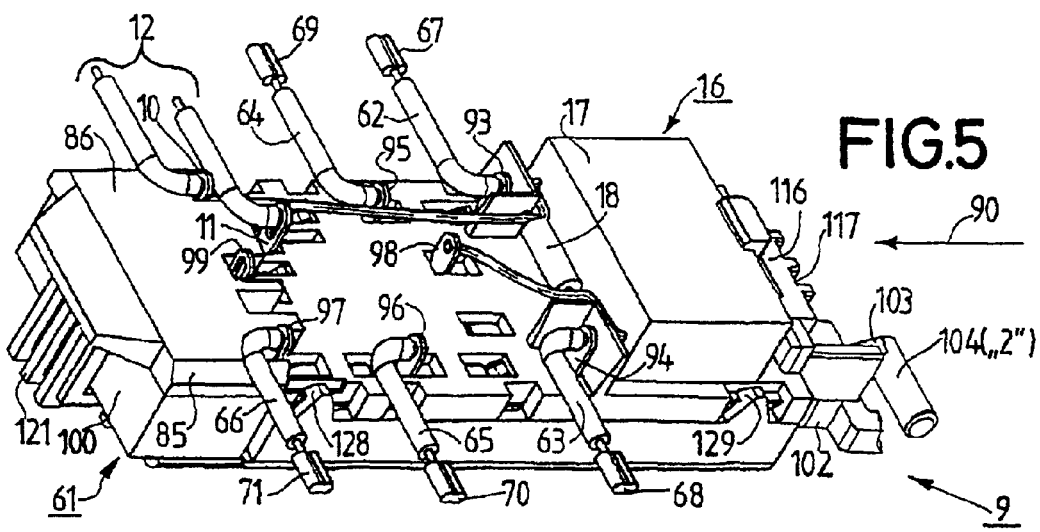
FIG. 5 is an oblique view from the top and the rear, showing the first module of FIGS. 2, 3 and 4 in its assembled condition.
Figure 6:
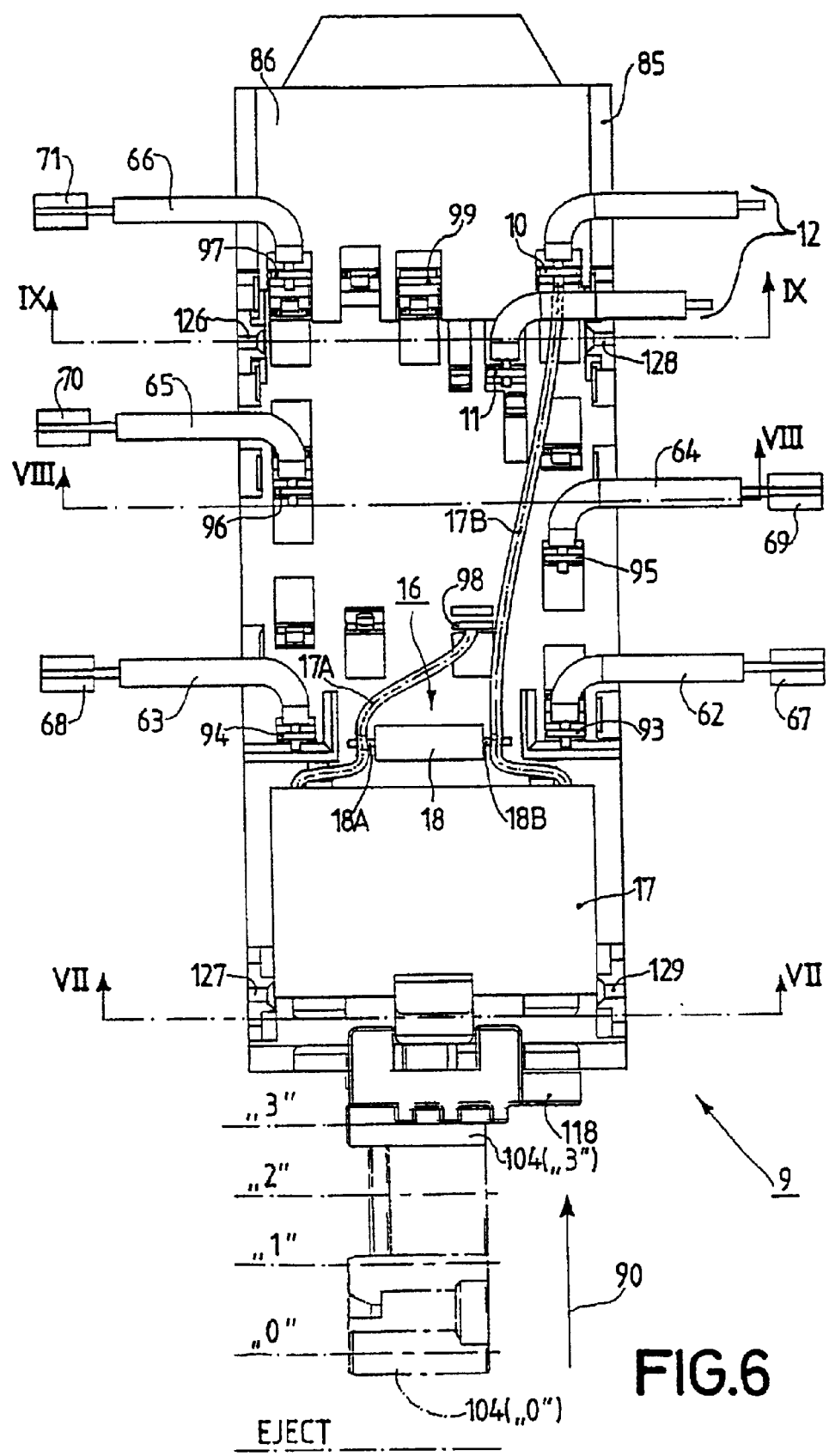
FIG. 6 is a plan view showing the first module of FIGS. 2, 3, 4 and 5.
Figure 7:
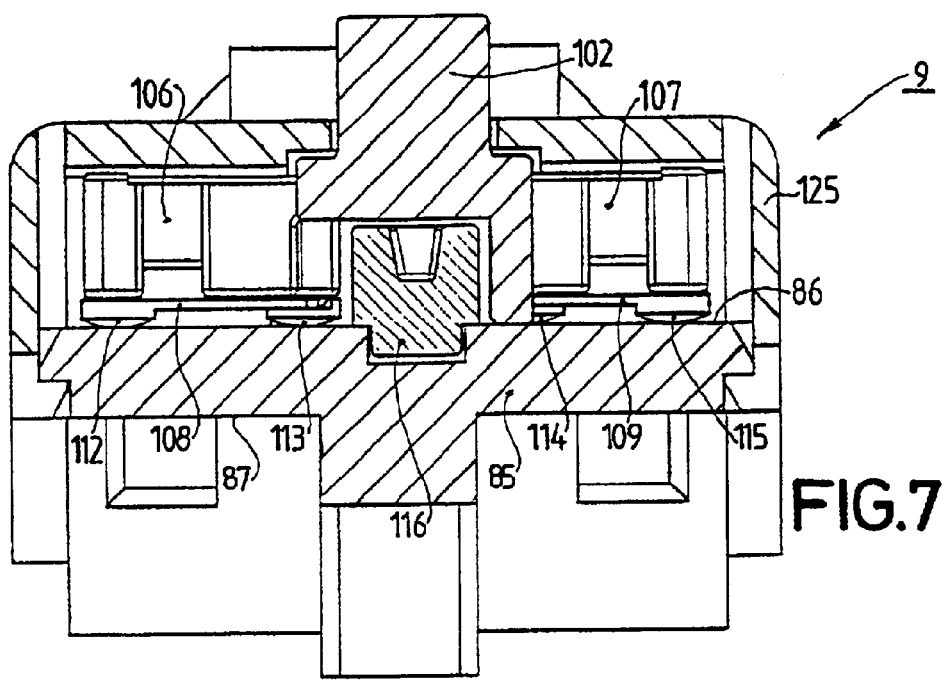
FIG. 7 shows the first module of FIGS. 2 to 6 in a sectional view taken on the line VII—VII in FIG. 6 but in an 180° inverted position.
Figure 8:
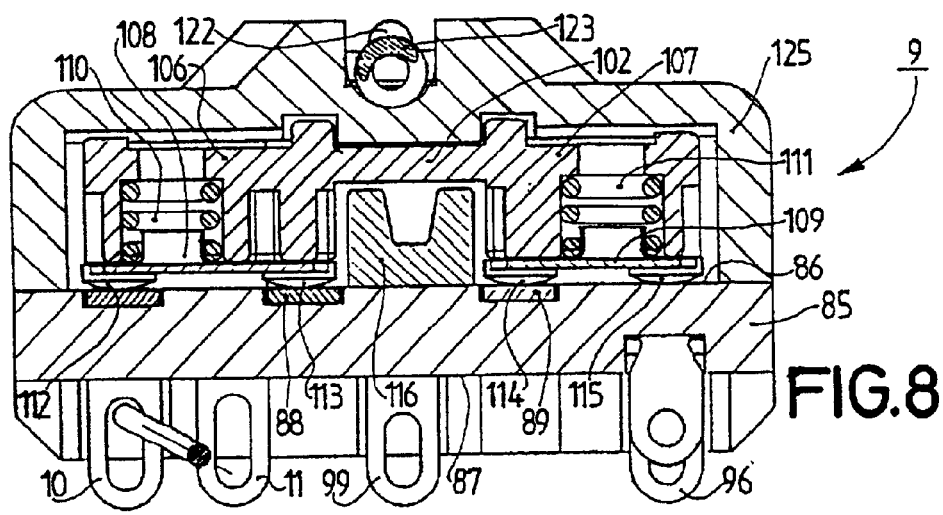
FIG. 8 shows the first module of FIGS. 2 to 7 in a sectional view taken on the line VIII—VIII in FIG. 6 but in an 180° inverted position.
Figure 9:
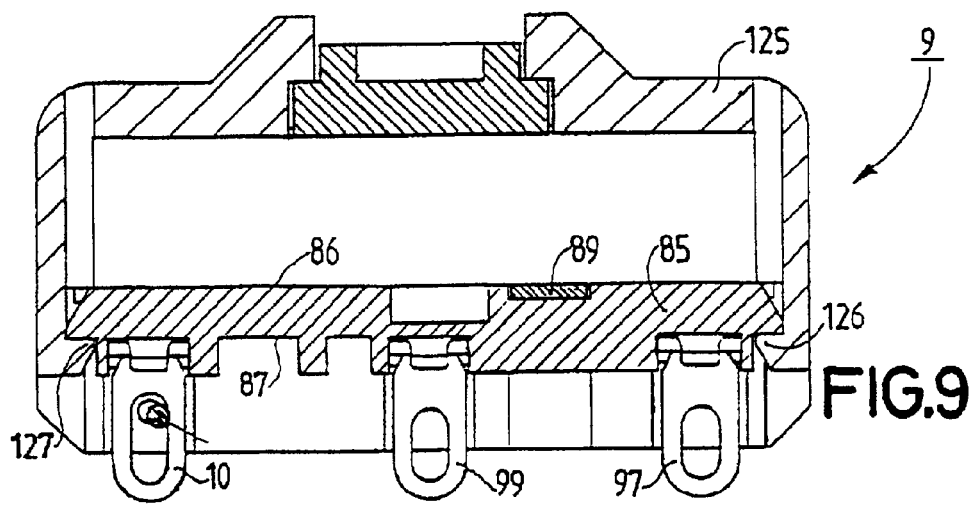
FIG. 9 shows the first module of FIGS. 2 to 8 in a sectional view taken on the line IX—IX in FIG. 6 but in an 180° inverted position.

FIG. 1 shows a hand-held mixer 1. The hand-held mixer 1 has a housing 2, which consists of two housing sections 3 and 4 held together with the aid of fastening means, which fastening means include two screws 5 and 6. The housing 2 has a grip portion 7, with the aid of which the hand-held mixer 1 can be held conveniently and simply with one hand in order to carry out a mixing process. The housing 2 further has a drive mounting portion 8, which mainly serves to accommodate a drive arrangement 26.

The grip portion 7 accommodates a first module 9. The first module 9 has two mains terminals 10 and 11 connected to a mains cord 12. The mains cord 12 is led through a passage 13 in a cord holder 14 having a suction cup 15 by means of which the cord holder 14 can be attached to the housing 2 of the hand-held mixer 1. The first module 9 further includes interference suppression means 16. The interference suppression means 16 consist of an interference suppression capacitor 17 and a resistor 18 arranged in parallel with the interference suppression capacitor 17. The interference suppression means 16 are connected to the two mains terminals 10 and 11 in an electrically conductive manner, i.e. they are arranged in parallel with the two mains terminals 10 and 11. The interference suppression means serve, in known manner, for interference suppression purposes.

The first module 9 further includes a switching means configuration, which is not shown in FIG. 1 and which includes speed switching means, which serve to switch the speed of a motor of the hand-held mixer 1 to different lower speed values, and which includes start means, which serve to start the motor of the hand-held mixer 1 at a higher speed. To actuate the speed switching means first movable actuating means 19 have been provided, which similarly to the first module are also accommodated in the grip portion 7 of the housing 2 and which include a first switching handle 20, which enables the speed switching means to be actuated. The first movable actuating means 19 are essentially formed by an arcuate slider 19. The slider 19 is guided so as to be movable along an arcuate path of movement 43, which is effected with the aid of guide ribs which are integral with the two housing sections 3 and 4 and which project from these two housing sections 3 and 4. The path of movement 43 is indicated by means of an arrow 43 in FIG. 1. The slider 19 is movable between five successive positions parallel to the path of movement 43, namely from a position "3" to a position "2" and further to a position "1" and then to a position "0" and from the last-mentioned position also into a position "Eject". The slider 19 can be locked in the positions "3", "2", "1" and "0" by means of a latching device 55, which consists of a latching spring 56, which is connected to the slider 19, and of a plurality of latching walls 57 connected to the housing section 3 and defining latching recesses. The slider is articulated to a rod 58, which in its turn is also articulated to the speed switching means of the first module 9.

In order to actuate the start means in the first module 9 second movable actuating means 21 have been provided, which are essentially formed by a lever 21, which is mounted so as to be pivotable about a pivot 22, which lever has a second switching handle 24 on its one lever arm 23 and whose second lever arm serves to actuate the start means. For the actuation of the start means the second switching handle 24 should be depressed against the force exerted by a return spring 21A that acts upon the lever 21.

The drive mounting portion 8 of the housing 2 accommodates a drive arrangement 26, already mentioned. The drive arrangement 26 includes a motor 27, which serves to drive pairs of mixing tools 28 and 29, 30 and 31, 32 and 33, 34 and 35. The motor 27 can be brought into electrically conductive contact with the two mains terminals 10 and 11, namely via the switching means configuration, which includes the speed switching means and the start means. The motor 27 is configured to be powered from an a.c. mains. The motor 27 is further configured for driving at three lower speeds and for driving at one speed that is high with respect to the lower speeds. With the aid of the speed switching means it is thus possible to switch to one of the three lower speeds in the positions "3", "2" and "1" of the slider 19 and, in addition, to disconnect the motor 27 from the mains terminals 10 and 11 in the position "0" of the slider 19. The motor 27 can be started at the higher speed with the aid of the start means.

The drive arrangement 26 further includes drive means 36, which can be driven by means of the motor 27 via an intermediate gear. The intermediate gear comprises a drive worm, which can be driven by the motor shaft, and worm wheels, which mesh with the drive worm, which is common practice and is therefore not expanded on. The drive means 36 include two inner drive sleeves 37 and 38 accommodated in two outer drive sleeves 39 and 40. The drive means 36 serve for rotationally driving each time two mixing tools 28 and 29, 30 and 31, 32 and 33, 34 and 35. The mixing tools can be coupled detachably to the drive means 36 in pairs, namely to the inner drive sleeves 37 and 38 and can be ejected and thus detached, from the drive means 36, i.e. from the two inner drive sleeves 37 and 38, in their axial directions 41.

In order to detach the mixing tools 28 and 29, 30 and 31, 32 and 33, 34 and 35 from the drive means 36, disengaging means 42 are accommodated in the housing 2. The disengaging means 42 are movable between a rest position and a disengaging position. The disengaging means 42 are movable from their rest position into their disengaging position parallel to the path of movement 43.

In the hand-held mixer 1 the disengaging means 42 and the first movable actuating means 19 including the switching handle 20 are advantageously united to a movable and integral second module 44. The second module 44 is arranged so as to be movable parallel to only one path of movement, i.e. the path of movement 43, both in order to actuate the speed switching means included in the first module 9 and in order to disengage the mixing tools 28 and 29, 30 and 31, 32 and 33, 34 and 35 from the drive means 36. The disengaging means 42 of the second module 44 are then movable into their disengaging position by means of the switching handle 20 of the first actuating means 19 of the second module 44. Moreover, the construction in the present case is such that the disengaging means 42 project transversely from the slider 19 forming the first movable actuating means 19 and comprise disengaging projections 45 and 46 adapted to cooperate with the mixing tools 28 and 29, 30 and 31, 32 and 33, 34 and 35. When the disengaging means 42 are in the rest position the two disengaging projections 45 and 46 are disposed just above the free ends 47 and 48, 49 and 50, 51 and 52, 53 and 54 of the mixing tools 28 and 29, 30 and 31, 32 and 33, 34 and 35. By a movement of the second module 44 along the path of movement 43 the disengaging means 42 are movable from the rest position into the disengaging position, as a result of which the mixing tools 28 and 29, 30 and 31, 32 and 33, 34 and 35, which are coupled to the inner drive sleeves 37 and 38, are ejected from the drive means 36, i.e. disengaged from the drive means 36, in the direction indicated by the arrow 41. The movement of the second module 44 and the disengaging means 42 incorporated therein from the rest position into the disengaging position is effected against the force exerted by a return spring 59, which is formed by a wire spring which acts on the disengaging means 42 between the two disengaging projections 45 and 46.

The hand-held mixer 1 described hereinbefore has a particularly simple construction for switching to different speeds of the mixing tools 28 and 29, 30 and 31, 32 and 33, 34 and 35 and for the disengagement of the mixing tools from the drive means 36. Furthermore, a simple operation of the hand-held mixer 1 is achieved because switching to different speeds of the mixing tools as well as ejection of the mixing tools can be effected by means of a single switching handle 20, which advantageously should be moved only parallel to a single path of movement 43.

As is apparent from the above description, the two mains terminals 10 and 11 and the interference suppression means 16 and the speed switching means as well as the start means are connected to the first module 9 mechanically and electrically. The first module 9 will be described in more detail hereinafter with reference to FIGS. 2 to 10.

Figure 10:
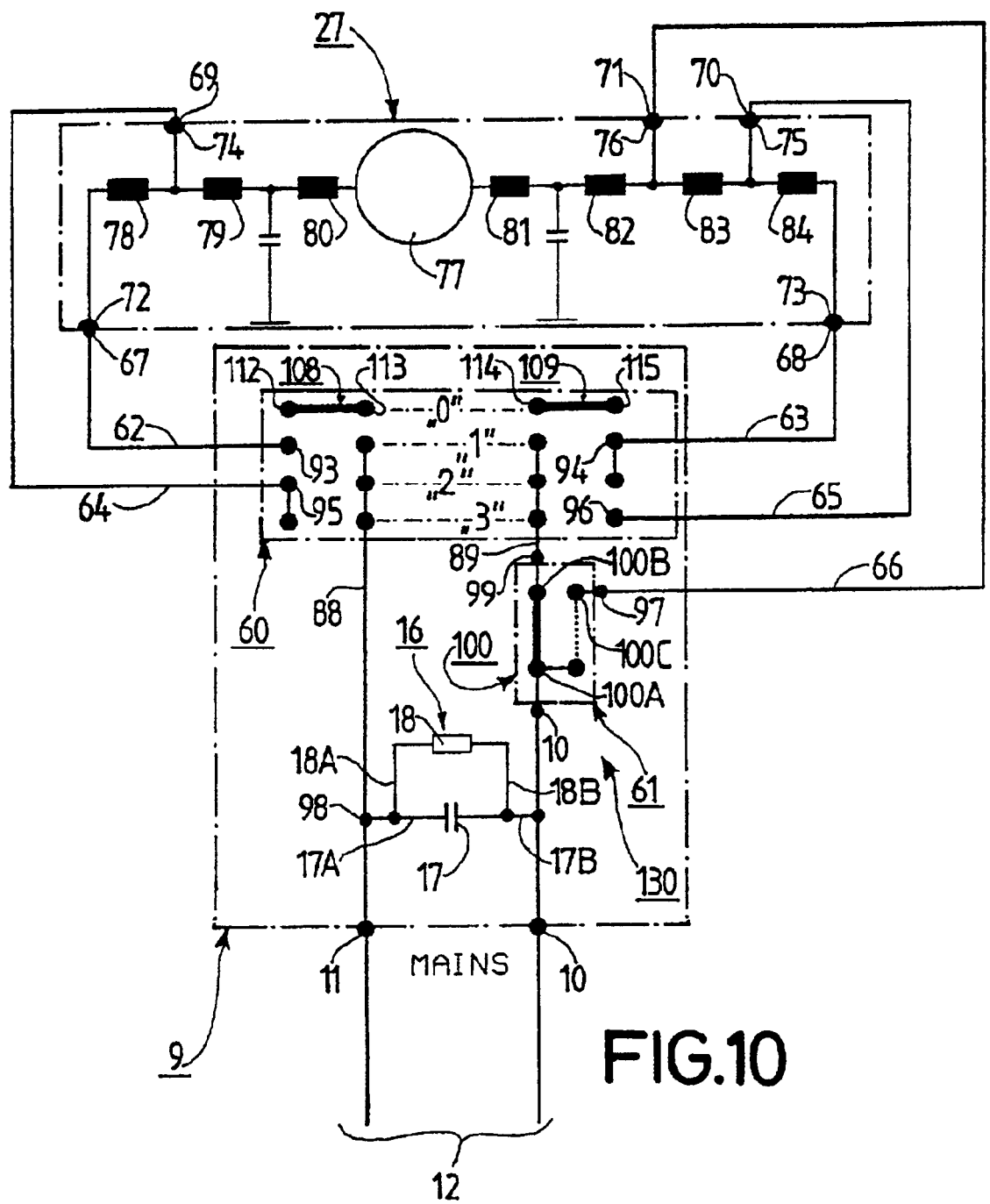
FIG. 10 is a circuit diagram of the electrical circuit of the hand-held mixer shown in FIG. 1.

In the first module 9, as is apparent particularly from the circuit diagram in FIG. 10, all the electrical connections between the two mains terminals 10 and 11 and the interference suppression means 16 and the speed switching means 60 as well as the start means 61 are realized directly on the module 9. This has the great advantage that during the production of the hand-held mixer 1 all these electrical connections need not be made separately, which saves a substantial amount of assembly operations and a considerable amount of assembly time.

As is apparent from FIG. 10 and also from FIGS. 2, 3, 4, 5 and 6, five connecting leads 62, 63, 64, 65 and 66 are fixedly connected to the first module 9 and have free ends 67, 68, 69, 70 and 71 arranged to be connected to motor terminals 72, 73, 74, 75 and 76.

Referring to FIG. 10, the following is to be noted as regards the motor 27. The motor 27 has a rotor 77 equipped with a rotor winding configuration, which is not shown and which can be energized via a commutator configuration, which is not shown either. The motor 27 has a total of seven field windings 78, 79, 80, 81, 82, 83 and 84. As is generally known, the speed of the motor 27 decreases as more of these field windings are included in the circuit of the motor 27.

The first module 9 has a supporting member 85 which at its underside is bounded by a substantially plane lower bounding surface and which at its upper side is bounded by an upper bounding surface 87. The interference suppression capacitor 17 and the resistor 18 of the interference suppression means 16 are connected to the supporting member 85 in the area of the upper bounding surface 87.

Electrically conductive contact strips 88 and 89 are connected to the supporting member 85 in the area of the lower bounding surface 86 and extend parallel to a strip direction 90, indicated by an arrow 90 in FIGS. 2, 3, 4, 5 and 6. The contact strips 88 and 89 form parts of a contact strip configuration 91, which includes further contact strips which also extend in the strip direction 90 and, in addition, further contact strips which extend transversely to the strip direction 90, for example the contact strips 92. Contact lugs 93, 94, 95, 96 and 97, to which the connecting leads 62, 63, 64, 65 and 66 are connected, project from the contact strip configuration 91 perpendicularly to the lower bounding surface 86 and extend through the supporting member 85. Furthermore, two contact lugs 98 and 99 project from the contact strip configuration 91. The contact lug 98, which is connected to the mains terminal 11, serves for the electrically conductive connection to a respective lead 17A, 18A of the capacitor 17 and of the resistor 18, which have their other leads 17B, 18B connected to the mains terminal 10. The two mains terminals 10 and 11 also take the form of contact lugs. The two leads 17A and 17B of the capacitor 17 are connected directly to the contact lugs 10 and 98, the leads 18A and 18B of the resistor 18 being soldered to the leads 17A and 17B of the capacitor 17. The contact lug 99, which is connected to the contact strip 89, serves for the electrically conductive connection to a second terminal 100B of a microswitch 100, which serves as a switching contact 100 that can be actuated by means of an actuating pin 101, which projects from the microswitch 100. The switching contact 100 formed by the microswitch 100 forms part of the start means 61 of the hand-held mixer 1. The microswitch 100 further has a second terminal 100A connected directly to the mains terminal 10. The microswitch 100 further has a third terminal 100C connected directly to the contact lug 97.

The first module 9 further includes a first slider 102, which is guided so as to be movable parallel to the strip direction 90. The first slider 102 serves to carry the mating contact. At one end the first slider 102 carries a coupling pin 104 on an arm 103 for the articulated coupling to the rod 58. This pin 104 and arm 103 thus form a means for actuating the slider 102 of the speed switching means 60 in response to mechanical input from the first movable actuating means 19. In the area of its other end 105 the slider 102 has two projections 106 and 107, which project laterally from the first slider 102. Each of the two projections 106 and 107 is connected to a contact link 108 and 109, a pressure spring 110, 111 being arranged between each of the two projections 106 and 107 band the two contact links 108 and 109, which springs urge the contact links 108 and 109 towards the contact strip configuration 91. Each of the two contact links 108 and 109 has two mating contacts 112, 113 and 114, 115, respectively, which cooperate with the contact strips of the contact strip configuration 91 and which together with the contact strips form the speed switching means 60. The two mating contacts 112 and 113 are interconnected in an electrically conductive manner with the aid of the contact link 108. The other two mating contacts 114 and 115 are interconnected in an electrically conductive manner with the aid of the contact link 109.

The first module 9 further includes a second slider 116, which is movable relative to the supporting member 85 and which serves as a switch actuator. In the area of its end 117 the second slider 116 has a laterally projecting limb 118. The limb 118 is disposed in the path of movement of the lever arm 25 of the second movable actuating means 21, which are movable with the aid of the second switching handle 24 against the force exerted by the return spring 21A. In the area of its other end 119 the second slider 116 is connected to a substantially U-shaped member 120 whose limb 121, which is remote from the second slider 116 serves to and is adapted to cooperate with the actuating pin 101 of the microswitch 100. A return spring 123 for the second slider 116 is attached to a pin 122, which projects from the second slider 116, and has its other end attached to a pin 124, which projects from a cover 125 of the first module 9. The cover 125 is locked to the supporting member 85 with the aid of latching projections 126, 127, 128 and 129. The parts of the first module 9 which lie between the supporting member 85 and the cover 125 are retained and partly guided with the aid of the cover 125.

With the aid of the speed switching means 60 it is possible to select and switch to three different low speeds for the mixing tools 28 and 29, 30 and 31, 32 and 33, 34 and 35, i.e. approximately 600 r.p.m. in position "1", approximately 800 r.p.m. in position "2" and approximately 1000 r.p.m. in position "3". With the aid of the start means 61 it is possible to select and activate a high speed for the mixing tools, namely approximately 1200 r.p.m.

In the hand-held mixer 1 shown in FIG. 1 the speed switching means 60 and the start means 61 form a switching means configuration 130 realized by means of a single module, namely by means of the first module 9. In addition to the switching means configuration 130, this first module 9 has two mains terminals 10 and 11 and the interference suppression means 16, which has proved to be advantageous in view of a simple and compact construction. Combining the two mains terminals 10 and 11, the interference suppression means 16, the speed switching means 60 and the start means 61 to the first module 9 also has the advantage of a substantially simpler mounting and the advantage of a substantially higher reliability. Moreover, this is achieved in that between the first module 9 and the motor 27 of the hand-held mixer 1 only a small number of connecting leads which are external to the first module are required.

What is claimed is:

1. A switching module (9) for a hand-held mixer (1) which has two mains terminals (10, 11) for connection to a source of electrical power, means (12) for connecting said mains terminals to a power source, and a motor (27) for driving mixing tools (28, 29, 30, 31, 32, 33, 34, 35), said motor being adapted to effect driving with at least two lower speeds and with a speed which is higher than the lower speeds, wherein the switching module (9) comprises:

speed switching means (60) for switching the speed of the motor (27) to different lower speed values, and means for actuating the speed switching means (60) in response to a first mechanical input, and start means (61) for starting the motor (27) at the higher speed in response to a second mechanical input, characterized in that the speed switching means (60) and the start means (61) as well as said two mains terminals (10, 11) are connected mechanically and electrically in the module (9), and all the electrical connections between the two mains terminals (10, 11) and the speed switching means (60) and the start means (61) are realized on the module (9).

2. A switching module (9) as claimed in claim 1, characterized in that interference suppression means (16) are also connected mechanically and electrically to, and realized on, the module (9).

3. A switching means configuration comprising a module (9) as claimed in claim 1, wherein said source of electrical power is an a.c. mains, characterized in that the switching means configuration comprises connecting leads (62, 63, 64, 65, 66,) fixedly connected to the module (9) and having free ends (67, 68, 69, 70, 71) arranged for connection to respective motor terminals (72, 73, 74, 75, 76).

4. A switching module (9) as claimed in claim 1, characterized in that the module (9) further comprises:

a supporting member (85) bounded by a bounding surface (86), electrically conductive contact strips (88, 89) connected to the supporting member (85) in the area of the bounding surface (86) and extending parallel to a strip direction (90), a first slider (102) which is guided so as to be movable relative to the supporting member (85) parallel to the strip direction (90) and which serves as a mating-contact holder and carries at least two mating contacts (112, 113, 114, 115) which are interconnected in an electrically conductive manner, which cooperate with the contact strips (88, 99) and which together with the contact strips (88, 89) form the speed switching means (60), a second slider (116) which is guided so as to be movable relative to the supporting member (85) and which serves as switching actuator, and a switching contact (100) which is disposed in the path of movement of the second slider (116) and which forms part of the start means (61).

5. A switching module (9) as claimed in claim 4, characterized in that the second slider (116) is also guided so as to be movable parallel to the strip direction (90).

6. A switching module (9) as claimed in claim 4, characterized in that at least two mating contacts (112, 113, 114, 115) which are carried by the first slider (102) and which are interconnected in an electrically conductive manner are associated with a contact link (108, 109).

7. A hand mixer (1), comprising:

a housing, tool connection means mechanically connected to said housing, and arranged for connection to mixing tools, means for connection to a source of electrical power, a motor (27) for driving said tool connection means, said motor being arranged to be energized from said source of electrical power, and being arranged to effect driving with at least two lower speeds and with a speed which is higher than the lower speeds, a first switching handle (20) and a second switching handle (24), and a switching module, wherein said housing, tool connection means, and motor do not form part of said module, characterized in that said switching module (9) includes:

speed switching means (60) for switching the speed of the motor (27) to different lower speed values, said speed switching means (60) being arranged for actuation by said first switching handle (20), start means (61) for starting the motor (27) at the higher speed, said start means (61) being arranged for actuation by said second switching handle (24), and two mains terminals (10, 11) arranged for electrical connection to said source of electrical power, the two mains terminals (10, 11) and the speed switching means (60) and the start means (61) being connected mechanically and electrically to form the module (9), and all the electrical connections between the two mains terminals (10, 11) and the speed switching means (60) and the start means (61) being realized on the module (9).

8. A hand mixer as claimed in claim 7, characterized in that said first switching handle (20), said second switching handle (24), and said means for connection to a source of electrical power do not form part of said module.

9. A hand-held mixer (1) as claimed in claim 7, further comprising interference suppression means (16) connected to the two mains terminals (10, 11) for the purpose of interference suppression, characterized in that the interference suppression means (16) also form part of the module (9).

10. A hand-held mixer (1) as claimed in claim 7, further comprising interference suppression means (46), characterized in that the interference suppression means (–1–6) are also connected directly on the motor, and comprise a capacitor which can discharge via windings on the motor.

11. A hand-held mixer (1) as claimed in claim 7, wherein said tool connection means is connected to selected ones of a plurality of mixing tools (28, 29, 30, 31, 32, 33, 34, 35).

12. A hand-held mixer (1) as claimed in claim 7, wherein said source of electrical power is an a.c. mains, and said motor has more than three terminals for selective connection to electrical power to cause the motor to operate at different speeds.

13. A hand-held mixer (1) as claimed in claim 12, characterized in that connecting leads (62, 63, 64, 65, 66) are fixedly connected to the module (9) and have free ends (67, 68, 69, 70, 71) arranged to be connected to respective ones of the motor terminals (72, 73, 74, 75, 76).

14. A hand-held mixer (1) as claimed in claim 7, characterized in that the module (9) further comprises:

a supporting member (85) bounded by a bounding surface (86), electrically conductive contact strips (88, 89) connected to the supporting member (85) in the area of the bounding surface (86) and extending parallel to a strip direction (90), a first slider (102) which is guided so as to be movable relative to the supporting member (85) parallel to the strip direction (90) and which serves as a mating-contact holder and carries at least two mating contacts (112, 113, 114, 115) which are interconnected in an electrically conductive manner, which cooperate with the contact strips (88, 99) and which together with the contact strips (88, 89) form the speed switching means (60), a second slider (116) which is guided so as to be movable relative to the supporting member (85) and which serves as switching actuator, and a switching contact (100) which is disposed in the path of movement of the second slider (116) and which forms part of the start means (61).

15. A band-held mixer (1) as claimed in claim 14, characterized in that the second slider (116) is also guided so as to be movable parallel to the strip direction (90).

16. A hand-held mixer (1) as claimed in claim 14, characterized in that at least two mating contacts (112, 113, 114, 115) which are carried by the first slider(102), and which are interconnected in an electrically conductive manner, are associated with a contact link (108, 109).

17. A hand mixer as claimed in claim 14, characterized in that said first switching handle (20), said second switching handle (24), and said means for connection to a source of electrical power do not form part of said module.

18. A hand-held mixer (1) as claimed in claim 14, further comprising interference suppression means (16) connected to the two mains terminals (10, 11) for the purpose of interference suppression, characterized in that the interference suppression means (16) also form part of the module (9).

19. A hand-held mixer (1) as claimed in claim 14, further comprising interference suppression means (46), characterized in that the interference suppression means are also connected directly on the motor, and comprise a capacitor which can discharge via windings on the motor.

20. A hand-held mixer (1) as claimed in claim 14, characterized in that connecting leads (62, 63, 64, 65, 66) are fixedly connected to the module (9) and have free ends (67, 68, 69, 70, 71) arranged to be connected to respective ones of the motor terminals (72, 73, 74, 75, 76).

* * * * *